United States Patent

Prosch et al.

[11] Patent Number: 5,987,887
[45] Date of Patent: Nov. 23, 1999

[54] MASTER CYLINDER

[75] Inventors: Gerhard Prosch; Christian Sperner, both of Hochstadt; Dieter Adler, Herzogenaurach; Peter Schaaf, Neustadt/Aisch, all of Germany

[73] Assignee: Luk GmbH & Co., Germany

[21] Appl. No.: 09/011,864

[22] PCT Filed: Sep. 27, 1996

[86] PCT No.: PCT/EP96/04229

§ 371 Date: Feb. 17, 1998

§ 102(e) Date: Feb. 17, 1998

[87] PCT Pub. No.: WO97/13671

PCT Pub. Date: Apr. 17, 1997

[30] Foreign Application Priority Data

Oct. 7, 1995 [DE] Germany ............. 195 37 423

[51] Int. Cl.⁶ ...................................................... B60T 7/02
[52] U.S. Cl. ........................................ 60/594; 60/533
[58] Field of Search ..................... 60/533, 594; 92/187

[56] References Cited

U.S. PATENT DOCUMENTS

| | | |
|---|---|---|
| 2,349,345 | 5/1944 | Goepfrich . |
| 4,109,899 | 8/1978 | Takatsu .................... 92/187 X |
| 4,372,118 | 2/1983 | Andresen ................... 60/533 X |
| 4,831,916 | 5/1989 | Leigh-Monstevens et al. ...... 92/187 X |
| 5,284,017 | 2/1994 | Kopacin ..................... 60/533 |

FOREIGN PATENT DOCUMENTS

| | | |
|---|---|---|
| 17488853 | 3/1957 | Germany . |
| 1930311 | 10/1963 | Germany . |
| 1525600 | 2/1970 | Germany . |
| 2751931 | 5/1970 | Germany . |
| 2510957 | 9/1976 | Germany . |
| 3720410 | 12/1988 | Germany . |
| 4201422 | 7/1993 | Germany . |
| 4212107 | 10/1993 | Germany . |
| 4434254 | 4/1995 | Germany . |
| 4405581 | 8/1995 | Germany . |
| 1455316 | 11/1976 | United Kingdom . |
| 407148 | 3/1980 | United Kingdom . |
| 2265963 | 10/1993 | United Kingdom . |

Primary Examiner—Hoang Nguyen
Attorney, Agent, or Firm—Bierman, Muserlian and Lucas

[57] ABSTRACT

A master cylinder for a hydraulic friction clutch, said master cylinder being connected to a physically actuatable pedal by a piston rod (17) which is articulated in semi-shells (14) enclosed in a piston skirt bushing (10), an end of said piston skirt bushing (10) remote from the piston rod (17) being connected to a piston (7) which is longitudinally displaceable in a guide sleeve (96) of the master cylinder (1), an end face of said piston (7) delimiting a pressure chamber (8) wherein the semi-shells (14) fill an inner space of the piston skirt bushing (10) without play and comprise a cup-shaped recess (15) in which a ball head (16) of the piston rod (17) is retained by positive locking, the piston skirt bushing (10) forming a structural unit with the radially stepped piston (7).

16 Claims, 1 Drawing Sheet

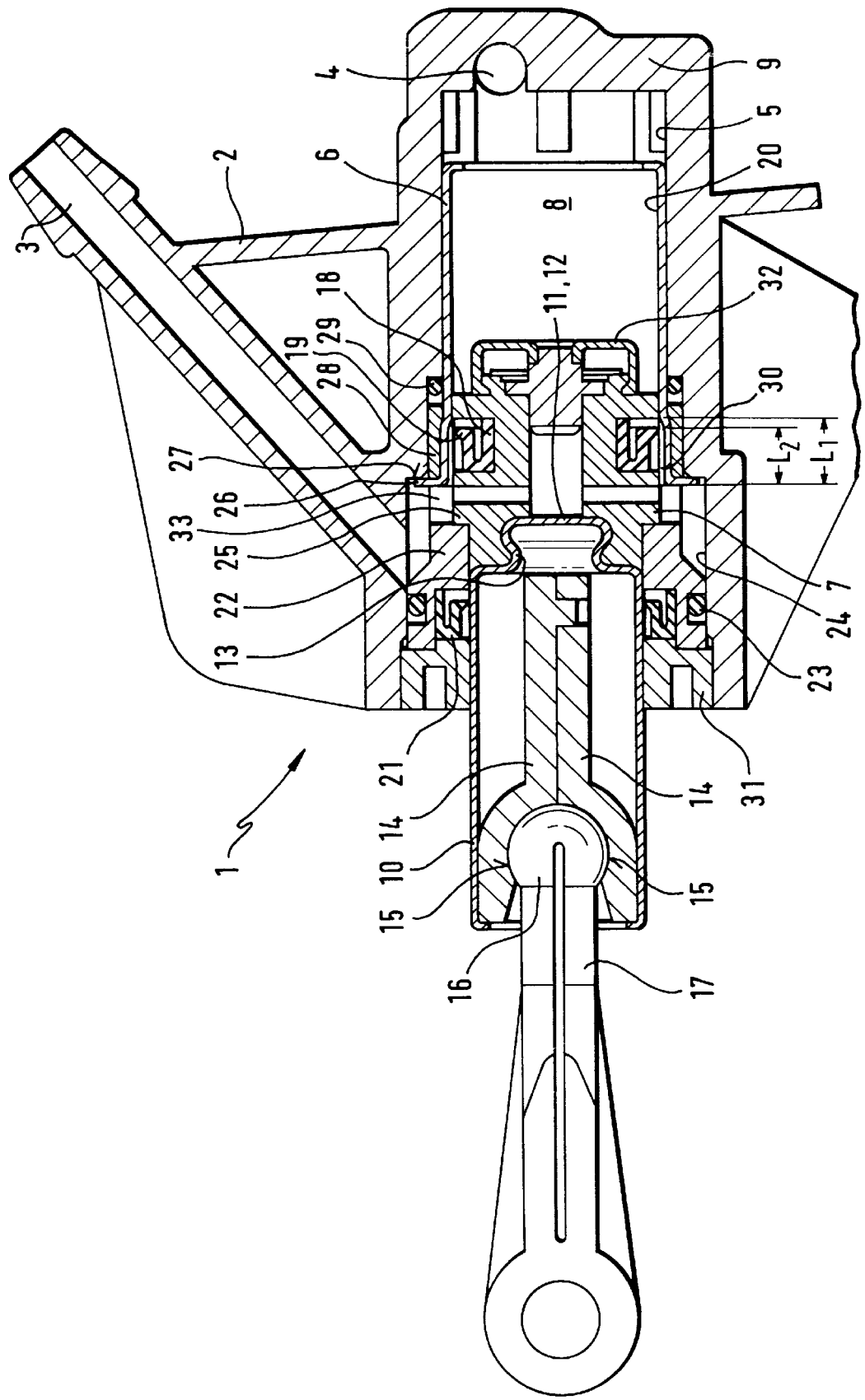

MASTER CYLINDER

FIELD OF THE INVENTION

The invention concerns a master cylinder for a hydraulic friction clutch or brake of a motor vehicle, said master cylinder being connected to a physically actuatable pedal by a piston rod which is articulated in retainer shells enclosed in a piston skirt bushing, an end of said piston skirt bushing remote from the piston rod being connected to a piston which is longitudinally displaceable in a guide sleeve of the master cylinder, an end face of said piston delimiting a pressure chamber which at the same time serves as a seal carrier.

BACKGROUND OF THE INVENTION

A master cylinder of the generic type known from DE-OS 42 12 107 comprises a piston composed substantially of a piston head and a piston skirt bushing. To form a structural unit, a centrally arranged, integrally formed piston neck of the piston is positively fixed in the piston skirt bushing. To obtain a positive locking of the piston skirt bushing on the piston neck, a radially inwards directed rim on the end of the piston skirt bushing engages a peripheral groove of the piston neck. The end of the piston neck facing the piston rod comprises a spherical depression on which the piston rod ball is supported. The piston rod ball is retained in the piston skirt bushing by two spherical semi-shells which partially enclose the piston rod ball and comprise projections whose ends form radially inwards directed sections which engage a groove of the piston neck and thus assure a positive locking. Further, the piston skirt bushing is longitudinally displaceable in a guide sleeve of the master cylinder. This prior art configuration of a master cylinder requires a special sealing of the piston neck in the piston skirt bushing and a very high technical production quality of the spherical semi-shells which together with the spherical depression on the end of the piston neck assure a positive retention of the piston rod ball. In addition, the assembly of the prior art master cylinder is very complicated and therefore results in high manufacturing costs.

OBJECT OF THE INVENTION

It is the object of the invention to provide a configuration of a master cylinder with the properties of improved functional reliability, simple assembly, design space optimization and economy.

SUMMARY OF THE INVENTION

The master cylinder (1) of the invention for a hydraulic friction clutch or brake of a motor vehicle, said mater cylinder (1) being connected to a physically actuatable pedal by a piston rod (17) which is articulated in retainer shells (14) enclosed in a piston skirt bushing (10), an end of said piston skirt bushing (10) remote from the piston rod (17) being connected to a piston (7) which is longitudinally displaceable in a guide sleeve (6) of the master cylinder (1), an end face of said piston (7) delimiting a pressure chamber (8) which at the same time serves as a seal carrier is characterized in that the retainer shells (14) which fill an inner space of the piston skirt busing (10) without play and, on their ends nearer the piston rod (17) comprise a cup-shaped recess (15) in which a ball head (16) of the piston rod (17) is retained solely by positive locking, the piston skirt bushing (10) forming a structural unit with the radially stepped piston (7) which is positively locked on a closed bottom (11) of the piston skirt bushing (10).

The articulation of the piston rod in the piston of the master cylinder is achieved by semi-shells which fill the inner space of the piston skirt bushing without play and, on their ends nearer the piston rod, comprise a cup-shaped recess each in which the ball head of the piston rod is retained solely by positive locking. In contrast to the prior art master cylinder, the semi-shells of the invention serve both to retain the ball head and to directly support and transmit the force exerted by the clutch pedal on the piston of the master cylinder. The piston is assembled from its individual parts as follows: the ball head of the piston rod is first placed in the cup-shaped recesses of the retainer shells before these are pushed into the piston skirt bushing whose end portion is then bent radially inwards to obtain a positional fixing of the retainer shells.

According to the invention, the piston skirt bushing forms a structural unit with the radially stepped piston by a positive retention of the piston on a closed bottom of the piston skirt bushing. This configuration favors a clearance-free connection of the piston to the piston skirt bushing and improves and facilitates sealing because the piston skirt bushing due to its closed bottom requires no sealing in the interior. This results in an enhanced functional reliability of the master cylinder with a concomitant cost advantage. Advantageously, the configuration of the master cylinder of the invention permits a simple assembly and optimizes design space.

In a further embodiment of the invention, the piston skirt bushing is chiplessly formed from steel onto which a plastic piston is injected and thus undetachably fixed thereto.

To further improve design space optimization, the closed bottom of the piston skirt bushing comprises a centrally projecting portion having an undercut recess, and the piston is retained on this projecting portion. This configuration has the advantage that the piston skirt bushing can be placed in a plastic injection molding tool in which the piston can be injected onto the piston skirt bushing.

Another advantageous feature of the invention is a one-piece configuration of the piston rod which connects the piston of the master cylinder to the physically actuatable pedal. Such a piston rod possesses weight and cost advantages over conventional multi-piece piston rods or piston rods made of steel. For reasons of strength and/or manufacturing, the piston rod of the invention may be made from a steel rod and a plastic eye affixed undetachably to its end nearer the pedal. Alternatively, the piston rod may also be made as a zinc die-casting or an aluminium casting.

In another advantageous embodiment of the invention, the path of displacement of the radially outwards stepped piston in the master cylinder is limited so that the piston at the same time constitutes a stop for the pedal in the neutral position of the friction clutch. Because the parts concerned in forming the stop viz., the piston and an intermediate ring inserted into the master cylinder, are made of plastic, the limitation of the displacement path of the pedal is advantageously noise-damped.

Sealing of the pressure chamber is achieved in a simple manner in that a primary seal is inserted into an annular groove of the piston and a sealing lip of this seal bears against an inner wall of the guide sleeve. Rearward of the primary seal there is arranged a secondary seal which is retained in the intermediate ring, a sealing lip of said secondary seal bearing against an outer peripheral surface of the piston skirt bushing. A further seal is arranged between the outer peripheral surface of the intermediate ring and the inner wall of the master cylinder. This sealing arrangement simplifies assembly because the seals can be pre-mounted on the piston and in the intermediate ring.

A positional fixing of the intermediate ring is obtained according to the invention by a securing ring arranged undetachably in front of the intermediate ring in the master cylinder. The intermediate ring which is made advantageously of the same material as the housing of the master cylinder, can be undetachably fixed in the housing by ultrasonic welding. Further, the intermediate ring can be used as a guide for the piston skirt bushing.

At least one shifting groove is arranged on the inner wall of the guide sleeve at its end nearer the piston rod so that, in a released position of the piston, a connection is established via the shifting groove to a replenishing reservoir from which a hydraulic fluid can flow pressurelessly into the pressure chamber when and as necessary. The longitudinal dimension of the chiplessly made shifting groove which extends in the longitudinal direction of the master cylinder, is larger than an axial dimension obtained in the neutral position of the master cylinder between a contact region of the sealing lip of the primary seal and an end of the guide sleeve.

To reduce wear of the sealing lips, rounded transitions are provided on the inner wall of the guide sleeve in the region of the shifting groove.

Further measures which can be implemented for reducing friction and wear of the sealing lips are a surface treatment and/or a coating of the outer peripheral surface of the piston skirt bushing and the inner wall of the guide sleeve.

In a further embodiment of the invention, the guide sleeve which is made chiplessly of sheet metal by deep drawing comprises on its end nearer the piston rod, a right-angled annular collar which in the installed state of the guide sleeve bears against an end face of the housing thus establishing a pre-defined position. Further, a bushing and a sealing ring are exteriorly associated to the the guide sleeve in the region of the shifting groove so that an interference fit of the guide sleeve and a sealing thereof in the housing are achieved.

To obtain an even more compact structure, a non-return valve is arranged on the end of the piston facing the pressure chamber, the end of the guide sleeve comprising an opening corresponding to the outer dimension of the non-return valve through which said non-return valve projects in an actuated position of the piston.

To obtain an optimization of weight, the housing and the piston of the master cylinder are made of a high strength, heat resistant plastic, particularly PA 66 GF.

BRIEF DESCRIPTION OF THE DRAWING

An example of embodiment of the invention will now be described with reference to the drawing which shows a longitudinal cross-section through a master cylinder of the invention.

DETAILED DESCRIPTION OF THE DRAWING

A master cylinder 1 of the invention represented in the sole figure comprises a housing 2 made of plastic. The master cylinder 1 can be supplied through a connection 3 with hydraulic fluid which can be routed through a connection 4 to a slave cylinder, not shown. The housing 2 comprises a radially stepped pocket bore 5, and a guide sleeve 6 whose inner wall serves to guide a piston 7 is inserted into the smallest diameter region of the pocket bore 5. An end face of the piston 7 and an end wall 9 of the housing 2 axially delimit a pressure chamber 8. The piston 7 shown in the neutral position i.e., in an unactuated position, forms a structural unit with a piston skirt bushing 10. For this purpose, the piston skirt bushing 10 comprises a closed bottom 11 having an axial extension 12 with an undercut recess 13 onto which the plastic piston 7 is injected to interlock therewith.

The piston skirt bushing 10 made chiplessly of sheet metal encloses two semi-shells 14 each of which comprises a spherical cup-shaped recess 15 at its end remote from the piston 7 for receiving a ball head 16 of a piston rod 17. The piston rod 17 is a one-piece structure made of plastic and connects a physically actuatable pedal, not shown, to the master cylinder 1.

To seal the pressure chamber 8 at its piston-proximate end, a primary seal 18 is disposed in a peripheral groove of the piston 7, a circumferential sealing lip 19 of the primary seal 18 bearing under radial pre-stress against an inner wall 20 of the guide sleeve 6. A secondary seal 21 associated to the primary seal 18 is arranged axially spaced from the primary seal 18 in an intermediate ring 22, a sealing lip of said secondary seal 21 bearing sealingly against the piston skirt bushing 10. The intermediate ring 22 which is inserted into the radially largest portion of the pocket bore 5 further comprises a sealing ring 23 retained in a circumferential groove thereof and serving to seal an annular gap between an inner wall 24 of the pocket bore 5 and the intermediate ring 22. The piston 7 comprises a radially outwards oriented step 25 which by bearing against an end face of the appropriately configured intermediate ring 22 limits the displacement of the piston 7 and at the same time constitutes a stop for the pedal. The intermediate ring 22 which comprises radial openings 33 bears against an end face of an annular collar 26 of the guide sleeve 6, said annular collar 26 being formed on the guide sleeve 6 to extend radially outwards at right angles and bear against a transition region 27 of the pocket bore 5 in the installed state.

A bushing 28 and a sealing ring 29 are exteriorly associated to the guide sleeve 6 in the region of the annular collar 26 to seal the guide sleeve 6 and permit a snug fit of the guide sleeve 6 in the housing 2. At its end nearer the annular collar 26, the inner wall 20 of the guide sleeve 6 comprises at least one shifting groove 30 whose longitudinal dimension "$L_1$" is larger than a dimension "$L_2$" between a contact region of the sealing lip 19 and the end of the guide sleeve 6. This assures that even in the neutral position of the piston 7, hydraulic fluid can flow pressurelessly into the pressure chamber 8 through the connection 3 if necessary. The intermediate ring 22 is positionally fixed by a securing ring 31 arranged in front of the intermediate ring 22. This securing ring 31 is advantageously made of the same material as the housing 2 and its outer surface is undetachably joined to the housing 2 by ultrasonic welding. The securing ring 31 also serves as a guide for the piston skirt bushing 10. A one-way valve 32 is arranged on the end of the piston 7 nearer the pressure chamber 8 for permitting an in-flow of hydraulic medium, when necessary, through the connection 3 into the pressure chamber 8 in the neutral position of the master cylinder 1.

We claim:

1. A master cylinder(1) for a hydraulic friction clutch or brake of a motor vehicle, said master cylinder (1) being connected to a physically actuatable pedal by a piston rod (17) which is articulated in retainer shells (14) enclosed in a piston skirt bushing (10), an end of said piston skirt bushing (10) remote from the piston rod (17) being connected to a piston (7) which is longitudinally displaceable in a guide sleeve (6) of the master cylinder (1), an end face of said piston (7) delimiting a pressure chamber (8) which at the same time serves as a seal carrier characterized in that the retainer shells (14) which fill an inner space of the piston skirt bushing (10) without play, comprise and, on their ends nearer the piston rod (17), a cup-shaped recess (15) in which a ball head (16) of the piston rod (17) is retained solely by positive locking, the piston skirt bushing (10) forming a structural unit with the radially stepped piston (7) which is positively locked on a closed bottom (11) of the piston skirt bushing (10).

2. A master cylinder of claim 1 wherein the piston skirt bushing (10) made chiplessly of steel and the piston (7) is made of plastic and is arranged on the piston skirt bushing (10).

3. A master cylinder of claim 1 wherein the bottom (11) comprises a centrally projecting extension (12) having an undercut recess (13), and the piston (7) is injected onto the extension (12).

4. A master cylinder of claim 1 wherein the piston rod (17) is a one-piece plastic element.

5. A master cylinder of claim 4 wherein the piston rod (17) is a steel rod to whose pedal-proximate end a plastic eye is fixed.

6. A master cylinder of claim 1 wherein an intermediate ring (22) and a step (25) limit a displacement path of the radially stepped piston (7) which thus constitutes a stop for the pedal.

7. A master cylinder of claim 1 wherein sealing of the pressure chamber (8) is achieved in that a primary seal (18) is inserted in the piston (7) and a sealing lip (19) of said primary seal (18) bears against an inner wall (20) of the guide sleeve (6), rearward of the primary seal (18) there is arranged a secondary seal (21) which is inserted in the intermediate ring (22), a sealing lip of said secondary seal (21) bearing against the piston skirt bushing (10), and an annular gap between the intermediate ring (22) and an inner wall (24) of a pocket bore (5) of a housing (2) is sealed by a sealing ring (23) which is guided in a peripheral groove of the intermediate ring (22).

8. A master cylinder of claim 7 wherein a securing ring (31) is undetachably positioned in front of the intermediate ring (22) in an end of the pocket bore (5).

9. A master cylinder of claim 1 wherein at least one chiplessly made snifting groove (30) extending in a longitudinal direction of the master cylinder (1) is arranged on a piston rod-proximate end of the inner wall (20) of the guide sleeve (6).

10. A master cylinder of claim 9 wherein a longitudinal dimension "$L_1$" of the snifting groove (30) is larger than an axial dimension "$L_2$" obtained in the neutral position of the piston (7) between a contact region of the sealing lip (19) of the primary seal (18) and an end of the guide sleeve (6).

11. A master cylinder of claim 9 wherein rounded transitions to the inner wall (20) of the guide sleeve (6) are arranged in the region of the snifting groove (30).

12. A master cylinder of claim 1 characterized by a surface treatment and/or coating of the outer peripheral surface of the piston skirt bushing (10) and the inner wall (20) of the guide sleeve (6).

13. A master cylinder of claim 1 wherein the guide sleeve (6) made chiplessly of sheet metal comprises on an end nearer the piston rod (17) a right-angled annular collar (26) which is supported on a transition region (27) of the pocket bore (5) in the installed state of the guide sleeve (6).

14. A master cylinder of claim 13 wherein a a bushing (28) and a sealing ring (29) are exteriorly associated to the guide sleeve (6) in the region of the annular collar (26).

15. A master cylinder of claim 1 wherein a one-way valve (32) is arranged on a pressure chamber-proximate end of the piston (7), the guide sleeve (6) comprising an opening corresponding to the outer dimension of the one-way valve through which said one-way valve projects in the actuated position of the piston (7).

16. A master cylinder of claim 1 wherein the housing (2), the piston (7) and the intermediate ring (22) are made of a high strength, heat resistant plastic, particularly PA 66 GF.

* * * * *